US009622296B2

(12) United States Patent
Dehnert et al.

(10) Patent No.: US 9,622,296 B2
(45) Date of Patent: Apr. 11, 2017

(54) INDUCTION COOKING HOB

(71) Applicant: Electrolux Home Products Corporation N.V., Brussels (BE)

(72) Inventors: Thomas Dehnert, Rothenburg ob der Tauber (DE); Alwin Neukamm, Rothenburg ob der Tauber (DE); Jurgen Leikam, Rothenburg ob der Tauber (DE)

(73) Assignee: Electrolux Home Products Corporation N. V., Brussels (BE)

( * ) Notice: Subject to any disclaimer, the term of this patent is extended or adjusted under 35 U.S.C. 154(b) by 247 days.

(21) Appl. No.: 14/368,562

(22) PCT Filed: Jan. 25, 2013

(86) PCT No.: PCT/EP2013/051412
§ 371 (c)(1),
(2) Date: Jun. 25, 2014

(87) PCT Pub. No.: WO2013/124116
PCT Pub. Date: Aug. 29, 2013

(65) Prior Publication Data
US 2014/0374411 A1  Dec. 25, 2014

(30) Foreign Application Priority Data

Feb. 20, 2012  (EP) .................................... 12156133

(51) Int. Cl.
*H05B 6/12*  (2006.01)
(52) U.S. Cl.
CPC ..... *H05B 6/1245* (2013.01); *H05B 2206/022* (2013.01); *Y02B 40/126* (2013.01)

(58) Field of Classification Search
CPC ... H05B 6/1245; H05B 40/126; Y02B 40/126
(Continued)

(56) References Cited

U.S. PATENT DOCUMENTS 3,561,020 A * 2/1971 Fritzsche .............. F24C 15/108
126/211
3,947,652 A   3/1976 Cobb
(Continued)

FOREIGN PATENT DOCUMENTS

DE  202009000990  3/2009
WO  2011077332  6/2011

OTHER PUBLICATIONS

International Search Report for PCT/EP2013/051412 dated Apr. 23, 2013, 2 pages.

*Primary Examiner* — Thien S Tran
(74) *Attorney, Agent, or Firm* — Pearne & Gordon, LLP

(57) ABSTRACT

The present invention relates to an induction cooking hob including at least one induction coil (20). The induction cooking hob comprises a housing (10) with at least one vertical wall (12, 14, 16) and a bottom panel (18). A top panel is provided for covering the top side of the housing (10). The induction coil (20) is connected or connectable to the at least one vertical wall (12, 14, 16) by at least one fixing element (22). A rigid conjunction is provided between the vertical wall (12, 14, 16) and at least one the fixing element (22). The induction coil (20) and the at least one fixing element (22) form a rigid body, so that the induction coil (20) is supported by the vertical wall (12, 14, 16). Further, the present invention relates to an induction coil (20) provided for said induction cooking hob.

12 Claims, 1 Drawing Sheet

Figure 1:
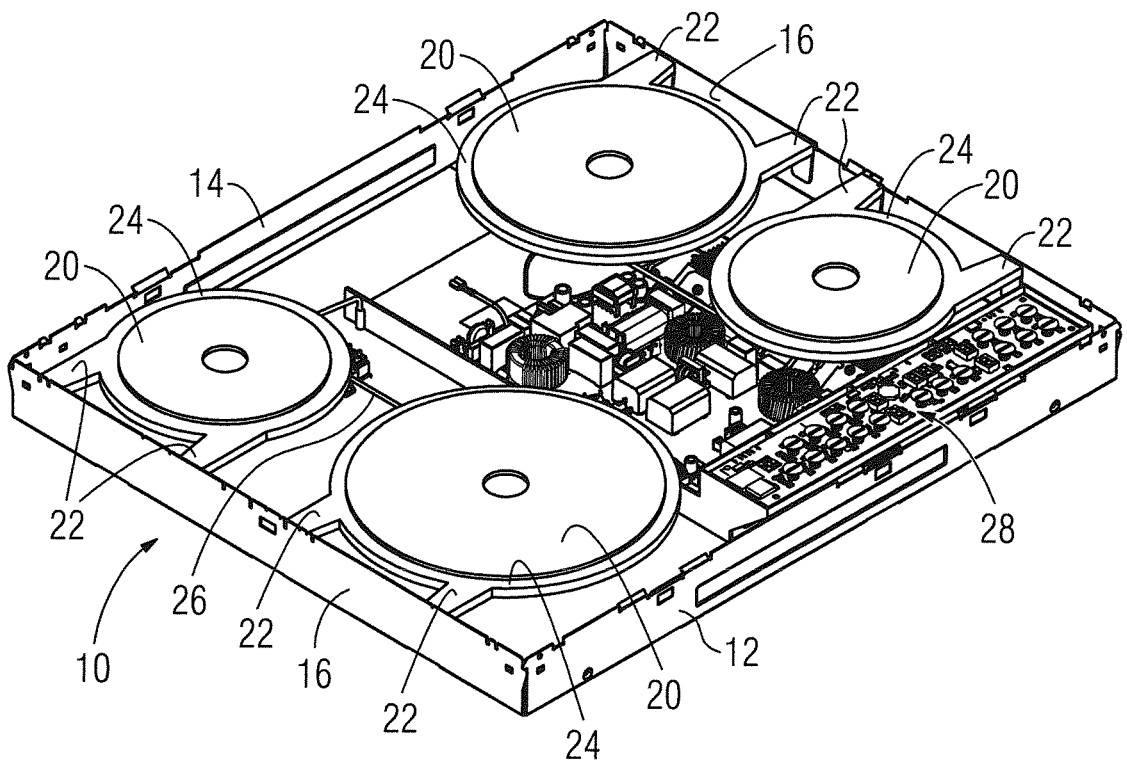

(58) Field of Classification Search
USPC ....... 219/448.11, 451.1, 452.11, 452.12, 623
See application file for complete search history.

(56) References Cited

U.S. PATENT DOCUMENTS

| | | | |
|---|---|---|---|
| 3,996,442 A | 12/1976 | Moreland et al. | |
| 4,490,596 A * | 12/1984 | Hirai | H05B 6/1263 126/21 A |
| 2010/0044367 A1* | 2/2010 | Kim | H05B 6/1263 219/660 |
| 2011/0100350 A1* | 5/2011 | Buck | F24C 15/108 126/214 A |

* cited by examiner

INDUCTION COOKING HOB

The present invention relates to an induction cooking hob according to the preamble of claim 1. Further, the present invention relates to an induction coil provided for said induction cooking hob.

In a conventional induction cooking hob the induction coils are fixed on the top side of a plastic housing. Said plastic housing is also the carrier of one or more printed circuit boards of the induction cooking hob. Thus, the induction coils and the printed circuit boards have to be arranged side-by-side on the housing. The arrangement of the induction coils depends on the sizes and positions of the printed circuit boards.

WO 2011/077332 A1 discloses a holding device for a support of an induction coil of an induction cooking hob. The holding device allows an elastic fastening of the support on the induction cooking hob. Since the induction coil is arranged on the support, and the support is arranged on the induction cooking hob again, this system is very complex.

It is an object of the present invention to provide an induction cooking hob, wherein the arrangement of the induction coils is independent of the positions and sizes of the printed circuit boards or other components of the induction cooking hob, and wherein the induction cooking hob has a low complexity.

The object of the present invention is achieved by the induction cooking hob according to claim 1.

According to the present invention the induction coil and the at least one fixing element form a rigid body, so that the induction coil is supported by the vertical wall.

The main idea of the present invention is the at least one fixing element allowing a rigid fastening of the induction coil at the vertical wall of the housing, so that the induction coil may be arranged at a higher level as other components inside the housing of the induction hob. Thus, the arrangement of the induction coils is independent of the positions and sizes of other component of the induction cooking hob. The fixing element is directly connected to the induction coil on the one side and also directly connected to the vertical wall of the housing on the other side. Thus, the complexity of the induction cooking hob is reduced.

Further, an elastic element may be provided between the induction coil and the bottom panel of the housing in order to press the induction coil against the top panel of the induction cooking hob.

In particular, the induction coil includes a supporting structure rigidly connected to the at least one fixing element. The supporting structure may be an integrated part of the induction coil.

For example, the supporting structure is formed as a circular disk or as a ring.

In particular, the supporting structure and the at least one fixing element are formed as a single-piece part.

Further, the fixing element may include a vertical part and a horizontal part.

Preferably, the horizontal part extends outwards from the supporting structure, and the vertical part extends perpendicular to said horizontal part and form the outer portion of the fixing element.

For example, the fixing element is connected or connectable to the vertical wall by at least one screw.

Alternatively, the fixing element is connected or connectable to the vertical wall by a welding connection.

According to another example, the fixing element is connected or connectable to the vertical wall by at least one snapping mechanism.

Preferably, the at least one induction coil is arranged at a higher level than the bottom panel.

Further, the induction cooking hob may comprise at least one printed circuit board supported by the bottom panel of the housing.

In particular, the at least one induction coil is arranged at a higher level than the at least one printed circuit board.

The present invention relates further to an induction coil comprising at least one fixing element, which is provided for the induction cooking hob mentioned above.

Novel and inventive features of the present invention are set forth in the appended claims.

Figure 2:
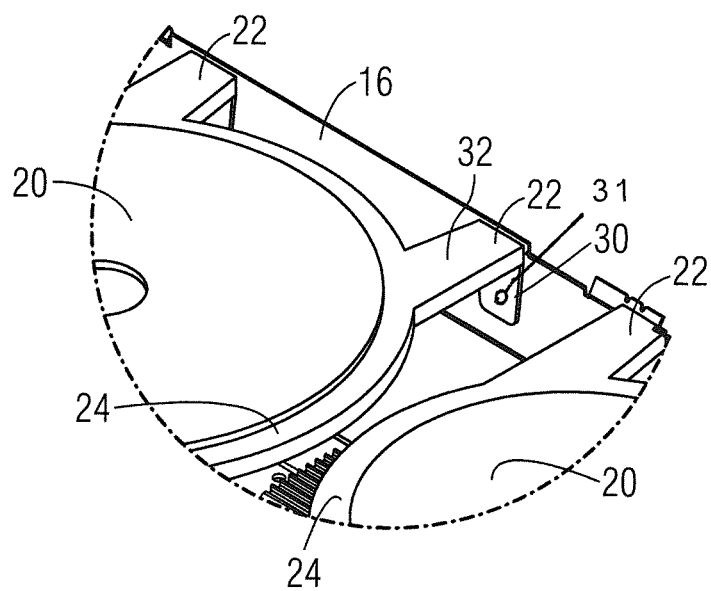

The present invention will be described in further detail with reference to the drawings, in which FIG. 1 illustrates a schematic perspective view of an induction cooking hob according to a preferred embodiment of the present invention, and FIG. 2 illustrates a detailed perspective view of fixing elements of an induction coil at the induction cooking hob according to the preferred embodiment of the present invention.

FIG. 1 illustrates a schematic perspective view of an induction cooking hob according to a preferred embodiment of the present invention.

The induction cooking hob comprises a housing 10, a number of induction coils 20 and a printed circuit board 28. In this example, the induction cooking hob comprises four induction coils 20. The housing 10 includes a front wall 12, a rear wall 14, two side walls 16 and a bottom panel 18. The top side of the housing 10 is covered by a top panel, in particular by a glass ceramic panel, which is not shown in FIG. 1.

The printed circuit board 28 is supported by the bottom panel 18 of the housing 10. The induction coils 20 are fixed at the side walls 16 of the housing 10. The induction coils 20 are arranged at a higher level as the printed circuit board 28. The induction coils 20 may be placed above the printed circuit board 28. Thus, the induction coils 20 on the one hand and the printed circuit board 28 on the other hand may be positioned inside the housing independent from each other. The arrangement of the induction coils 20 on the cooking hob is not restricted by the printed circuit board 28.

The induction coils 20 are fixed at the side walls 16 and spaced from the bottom panel 18 of the housing 10. Each induction coil 20 includes a supporting structure 24. The supporting structure 24 of the induction coil 20 has a flat form and extends substantially in a horizontal plane. In this example, the supporting structure 24 is formed as a circular disk or a ring.

Each induction coil 20 includes fixing elements 22 in order to fasten said induction coil 20 at one of the side walls 16 of the housing 10. In this example, each induction coil 20 includes two fixing elements 22. In general, the induction coil 20 includes one or more fixing elements 22.

The fixing elements 22 are detachably or permanently connected to the supporting structure 24 of the corresponding induction coil 20. In this example, the supporting structure 24 and the two fixing elements 22 form a single-piece part. The fixing elements 22 extend outwards from the supporting structure 24. Each fixing element 22 forms an appendix of the supporting structure 24.

The induction coil 20 with the supporting structure 24 and the fixing elements 22 allows a fastening of said induction coil 20 at arbitrary positions of the side walls 16, the front wall 12 and/or the rear wall of the housing 10.

Further, at least one spring element 26 is provided between the induction coil 20 and the bottom panel 18 of the housing 10. The spring element 26 acts between the induction coil 20 and the bottom panel 18, so that the induction coil 20 is pressed against the top panel, in particular against the glass ceramic panel of the induction cooking hob.

FIG. 2 illustrates a detailed perspective view of the fixing elements 22 of the induction coil 20 at the induction cooking hob according to the preferred embodiment of the present invention. In particular, FIG. 2 clarifies the structure of the fixing element 22 and fastening at the side wall 16 of the housing 10.

In this example, the both fixing elements 22 and the supporting structure 24 of the induction coil 20 form a single-piece part. Alternatively, the fixing elements 22 may be detachably or permanently connected to the supporting structure 24 of the corresponding induction coil 20.

The fixing element 22 includes a vertical part 30 and a horizontal part 32. The vertical part 30 and the horizontal part 32 of the fixing element 22 are formed as sheet element in each case. The horizontal part 32 of the fixing element 22 extends outwardly from the supporting structure 24 of the corresponding induction coil 20. The vertical part 30 extends perpendicular to the horizontal part 32 of the fixing element 22, so that the vertical part 30 forms the outer portion of the fixing element 22. An outer surface of the vertical part 30 lies against an inner side of the side wall 16.

The vertical part 30 of the fixing element 22 may fastened by one or more screws at the side wall 16 of the housing 10. Further, the fixing element 22 or the vertical part 30 of the fixing element 22, respectively, may be fastened by a snapping mechanism. Moreover, the fixing element 22 or the vertical part 30 of the fixing element 22, respectively, may be welded or glued at the side wall 16 of the housing 10. In FIG. 2, the several fastening means are indicated by reference number 31.

In this example, the outer surfaces of the vertical parts 30 of the both fixing elements 22 of one induction coil 20 are in the same plane. Thus, said both fixing elements 22 are provided for the same side wall 16 of the housing 10. Further, the outer surfaces of the vertical parts 30 of two fixing elements 22 of one induction coil 20 may be arranged perpendicular to each other, so that the induction coil 20 may be fastened in a corner of the housing 10. In this case, at least one fixing element 22 may be fastened at the side wall 16 of the housing 10, and at least one further fixing element 22 may be fastened at the front wall 12 or rear wall 14 of said housing 10.

Although an illustrative embodiment of the present invention has been described herein with reference to the accompanying drawings, it is to be understood that the present invention is not limited to that precise embodiment, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS 10 housing
12 front wall
14 rear wall
16 side wall
18 bottom panel
20 induction coil
22 fixing element
24 supporting structure
26 spring element
28 printed circuit board
30 vertical part
32 horizontal part

The invention claimed is:

1. An induction cooking hob including at least one induction coil (20), wherein:
the induction cooking hob comprises a housing (10) with at least one vertical wall (12, 14, 16) and a bottom panel (18),
a top panel is provided for covering the top side of the housing (10),
the induction coil (20) is connected or connectable to the at least one vertical wall (12, 14, 16) by at least one fixing element (22), the induction coil (20) includes a supporting structure (24) rigidly connected to the at least one fixing element (22), and
a rigid conjunction is provided between the vertical wall (12, 14, 16) and the at least one fixing element (22), characterized in, that
the supporting structure (24) is an integrated part of the induction coil (20), and the supporting structure (24) and the at least one fixing element (22) are formed as a single piece part, so that the induction coil (20) and the at least one fixing element (22) form a rigid body that is supported by the vertical wall (12, 14, 16) which comprises an exterior vertical wall of the housing (10).

2. The induction cooking hob according to claim 1, characterized in, that an elastic element (26) is provided between the induction coil (20) and the bottom panel (18) of the housing (10) in order to press the induction coil (20) against the top panel of the induction cooking hob.

3. The induction cooking hob according to claim 1, characterized in, that the supporting structure (24) is formed as a circular disk or as a ring.

4. The induction cooking hob according to claim 1, characterized in, that the fixing element (22) includes a vertical part (30), that is fixedly attached to the exterior vertical wall, and a horizontal part (32).

5. The induction cooking hob according to claim 4, characterized in, that the horizontal part (32) extends outwards from the supporting structure (24), and the vertical part (30) extends perpendicular to said horizontal part (32) and form the outer portion of the fixing element (22).

6. The induction cooking hob according to claim 1, characterized in, that the fixing element (22) is connected or connectable to the exterior vertical wall (12, 14, 16) by at least one screw.

7. The induction cooking hob according to claim 1, characterized in, that the fixing element (22) is connected or connectable to the exterior vertical wall (12, 14, 16) by a welding connection.

8. The induction cooking hob according to claim 1, characterized in, that the fixing element (22) is connected or connectable to the exterior vertical wall (12, 14, 16) by at least one snapping mechanism.

9. The induction cooking hob according to claim 1, characterized in, that the at least one induction coil (20) is arranged at a higher level than the bottom panel (18).

10. The induction cooking hob according to claim 1, characterized in, that the induction cooking hob comprises at least one printed circuit board (28) supported by the bottom panel (18) of the housing (10).

11. The induction cooking hob according to claim 10, characterized in, that the at least one induction coil (20) is arranged at a higher level than the at least one printed circuit board (28).

12. An induction coil (20) for an induction cooking hob, characterized in, that the induction coil (20) comprises at least one fixing element (22) and is provided for the induction cooking hob according to claim 1.

* * * * *